United States Patent [19]

de Rothschild, deceased

[11] Patent Number: 4,868,028

[45] Date of Patent: Sep. 19, 1989

[54] TRANSPORT AND STORAGE CASE

[75] Inventor: Philippe de Rothschild, deceased, late of Paris, France, by Phillippine de Rothschild, legal representative

[73] Assignee: Baron Philippe de Rothschild S.A., Pauillac, France

[21] Appl. No.: 148,978

[22] Filed: Jan. 26, 1988

Related U.S. Application Data

[63] Continuation of Ser. No. 79,353, Jul. 30, 1987, abandoned.

[30] Foreign Application Priority Data

Jul. 30, 1986 [FR] France ................ 86 11045

[51] Int. Cl.⁴ .............................. B32B 1/02
[52] U.S. Cl. .................... 428/71; 428/100; 217/127; 217/19
[58] Field of Search ............ 428/71, 35, 98, 100; 217/19, 35, 127; 220/902; 206/545; 62/371

[56] References Cited

U.S. PATENT DOCUMENTS

| | | |
|---|---|---|
| 3,241,661 | 3/1966 | Zamzow et al. ............ 217/19 |
| 4,438,637 | 3/1984 | Atkinson . |
| 4,446,705 | 5/1984 | Loucks . |
| 4,533,050 | 8/1985 | Bake, Jr. . |

FOREIGN PATENT DOCUMENTS

| | | |
|---|---|---|
| 1258696 | 3/1961 | France . |
| 392377 | 9/1965 | Switzerland . |
| 867467 | 5/1961 | United Kingdom . |
| 978454 | 12/1964 | United Kingdom . |

Primary Examiner—Alexander S. Thomas
Attorney, Agent, or Firm—Krass & Young

[57] ABSTRACT

The present invention concerns a re-usable packing case constituted by an outer rigid parallelepipedical structure e.g. of wood, comprising a parallelepipedical block of insulating material having cylindrical through holes adapted to receive bottles. The two side faces of this block of insulating material which are traversed by the cylindrical through holes are closed by plates of insulating material. One of these side faces of the outer, rigid structure, adjacent to one of the plates of insulating material, is constituted by a removable cover which is kept closed by appropriate means.

The packing cases according to the present invention may be used specially for the transport and the storage of wine and liquor bottles, whereby free access to the interior of each case is maintained during storage in stacked condition.

8 Claims, 1 Drawing Sheet

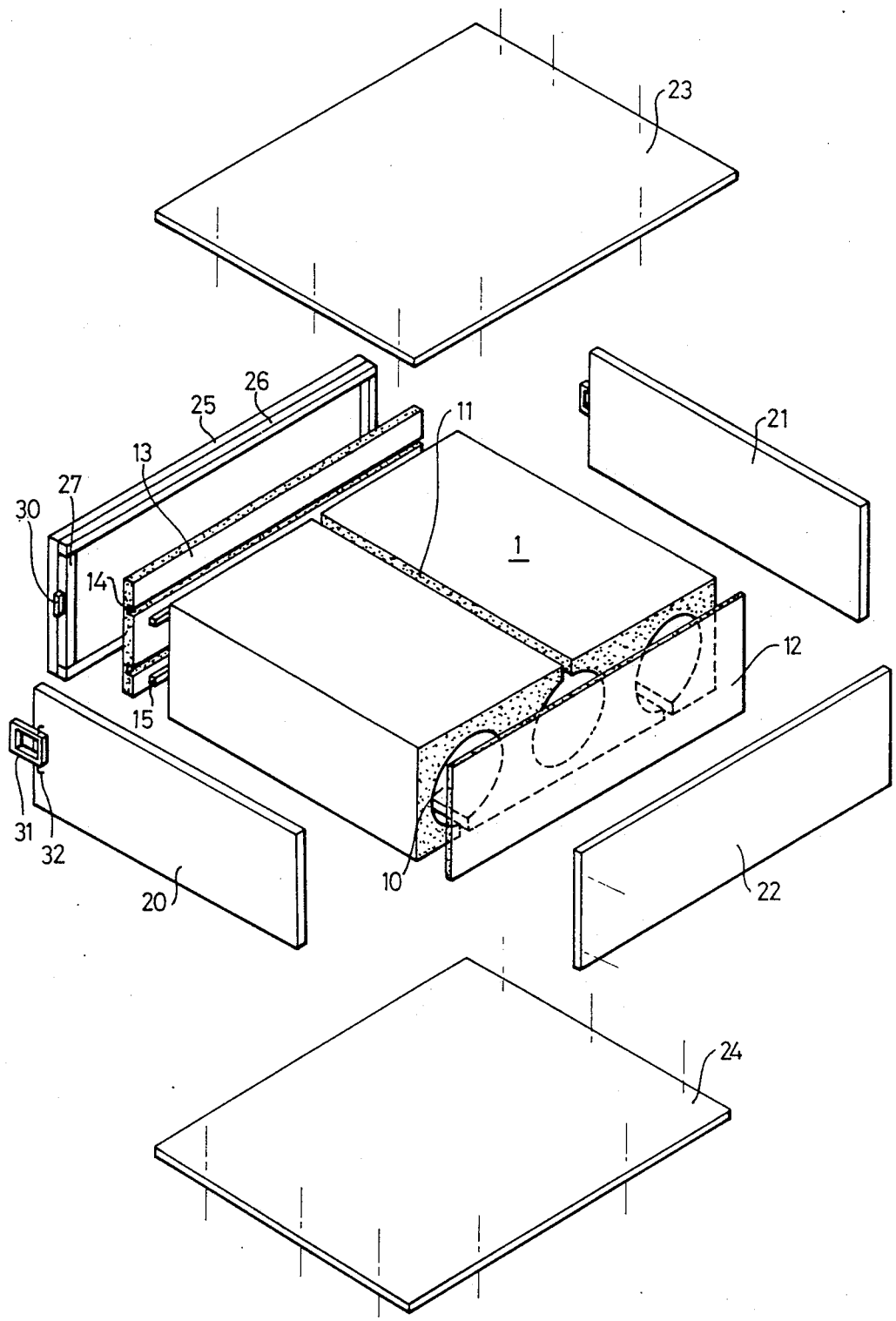

TRANSPORT AND STORAGE CASE

This application is a continuation of Ser. No. 079,353 filed July 30, 1987.

FIELD OF THE INVENTION

The present invention relates to a packing and storing case for glass bottles, in particular wine and liquor bottles, which permit to be stacked in piles whereas they provide free access to each unit in stacked condition.

BACKGROUND OF THE INVENTION

Generally, wines and liquors of a certain quality are shipped and transported in wooden cases. The number of bottles per unit may vary between two to three, six or twelve bottles which are generally insulated from one another in order to avoid breakage during transportation. The bottles are arranged in horizontal orientation such that the corks are always in contact with the liquid in order to avoid its drying. Once the bottles are laid on the bottom of the cases, the cover is generally nailed or otherwise attached to the upper portion of the case. Such packing cases are perfectly adapted to the different transport conditions, however, there is still a problem related to stocking of those cases. In general, these cases are stacked one on top of the other and it is evident that there is no access to the individual cases under those conditions. Access to a certain packing unit may only be obtained after various manipulations or to the topmost one.

French patent No. 2,473,469 describes a transport case and a stocking device for bottles which permits to constitute a modular deposit by stacking of individual units. The bottles which are initially arranged along the longest dimension of the case are extracted from said case after opening of the upper cover which may slide within two parallel groves, and the bottles are arranged thereafter perpendicularly to said longest dimension and cross a side face of said case which is provided with openings, permitting the passage of the bottles. Further, receiving units are provided which, after a 90° rotation, support the bottles in their new position. Thus, the product is stocked and permanently accessible since a portion of the bottle, in general the neck portion thereof, is maintained outside of said cases.

It is evident that various manipulations are necessary to obtain a stacking of these bottles in a condition where they are individually accessible, whereby it is also evident that those various manipulations are disadvantageous for producers and sellers of large numbers of bottled products. Further, it is a disadvantage that a portion of the bottles always projects from its corresponding support.

SUMMARY OF THE INVENTION

The present invention has therefore the object to provide a re-usable packing and storage unit for liquid-containing glass bottles, permitting their transportation, their mechanical protection and a diminuation of thermal shocks, at the same time as they provide the possibility of stacking those cases in piles such that free access to each case is maintained within those piles. The packing and storage case, according to the present invention, is characterized in that it constitutes a volume of insulating material which comprises openings capable of receiving bottles; and a rigid, parallelipipedical structure, one side face thereof being removable and containing insulating material.

In order to avoid exposure of the product to excessive temperature variations, the packing cases are constituted such that the bottles are totally insulated from the exterior. To this end, plates of insulating material are arranged at the two side ends of the volume of insulating material, thereby closing the openings within which are received the various bottles.

According to a different embodiment of the invention, the removable side face is connected to the rigid, parallelepipedical outer main structure by means of one or more clips. Further, according to the present invention, the volume of insulating material comprises slots which are arranged such that the open diameter of the openings receiving the bottles may be slightly varied in order to facilitate the introduction of bottles of various diameters, on the one hand, but also to provide a limited yield of the structure of insulating material in order to avoid hurting of the levels during the passage of the bottles into the openings.

In order to facilitate the transport, in particular by modern technics utilizing transport palets, the transport and stocking cases according to the present invention comprise removable intercalations which may be disposed within those cases when they are not used.

The following is a description of an embodiment of a case according to the present invention wherein reference is made to the unique figure of the accompanying drawing, representing an explosion vue of a case according to the present invention.

BRIEF DESCRIPTION OF THE DRAWING

The FIGURE shows the storage case of the invention.

DETAILED DESCRIPTION OF THE PREFERRED EMBODIMENTS

The volume of insulating material 1 is constituted by a parallelepipedical block comprising cylindrical openings 10. A material which may be employed for the purpose described herein may be polystyrene. Each of those openings comprises a slot 11 arranged in axe-parallel orientation on its periphery providing communication of each cylindrical opening alternatively with the upper or the lower surface of the block. Said slots may be obtained directly by the corresponding shape of the mold or by subsequent cutting. An insulating plate 12 is arranged at one of the side surfaces of the insulating structure perpendicularly to the longitudinal dimension of the cylindrical openings. On the opposite side face, an other insulating plate 13 provides obturation of the cylindrical openings at their other ends. This second insulating plate 13 is provided with two grooves 14 of square profile, the orientation of those grooves being substantially parallel to the longer dimension of said plate. These grooves are provided in order to receive wooden intercalations 15 of complementary profile such that they may be totally received within the plate 13. The wooden case per se is constituted of three side faces 20, 21 and 22 as well as an upper plate 23 and a lower plate 24 whereby these three side faces and two plates form the above mentioned parallelepipedical rigid exterior structure. These five elements are assembled in classical manner by means such as nails, screws, hooks or other. The fourth side face constitutes a removable cover which is constituted by a plate 25 and side bars such as 26 and 27 which are arranged on the face of plate 25 which is oriented towards the interior of the case. These side bars have a thickness such as to define a frame which contains entirely the insulating plate 13 and the intercalations 15.

The connection between this cover and the rigid parallelepipedical structure consists of a projection 30 arranged on the side bar 27 and cooperating with clip 31 which is fastened on the side wall 20 such that it may pivot around an axis 32.

The case, once assembled, provides, thus, free access to its interior through one of its side faces.

During packing of the bottles, the cases are vertically disposed with the open face upwards and the bottles are vertically introduced into the different cases. The open face of the case is thereafter closed by the cover and the clips are shut over the projections. Now the cases may be arranged horizontally and be stacked one upon the other such that the face 23 of one case contacts the face 24 of the next case. Dependent on the type of stacking, the wooden intercalations are removed from the covers in order to be put in between two cases, or the cases may be stacked one on the other without intercalations.

In the case of stacking on a transport palet where a plastic film is put around the cases, or for transportation in a container, the intercalations are not utilized and the cases abut one onto the other, whereby the elimination of the space between the cases represents a gain of transport space.

On the other hand, during long-term storage in a depot, the intercalations are removed from the covers and put in between the cases in order to facilate manual or automatic manipulation.

The different modes of storage of variable duration must permit free access to each case in order to allow verification of their contents or to check certain elements of those contents in order to verify details such as provenance and other. In this case, it suffices, without manipulating an entire stack, to open the clips, remove the covers and withdraw a bottle from its respective opening within the insulating material. It is evident that each bottle is perfectly surrounded by insulating material around its cylindrical surface as well as at its two ends, bottom and neck, thus, limiting excessive variations of the temperature.

Once a case is emptied, it may be re-utilized since it did not suffer any destructive treatment.

The present invention is, of course, not limited to the embodiment such as described above. Thus, the opening of the case may be as well arranged at a large surface thereof and the closing means of the cover may be constituted by any other known means such as a knuckle joint or any other equivalent technical means which provides the same result. Further the synthetic material utilized as the insulator which fills the case except the openings provided for the bottles, and which has been described to be made of polystyrene, may be substituted by any other appropriate synthetic material which provides a sufficient mechanical and thermal protection. Also, the intercalations may be arranged within the case at any appropriate location.

The material of the parallelepipedical rigid structure may be wood or any other material which provides sufficient rigidity to permit stacking of a certain number of cases one on another, such that a single pile of cases is provided with sufficient stability without the risk of collapsing.

The present invention is not limited to the embodiments as described above and it covers, to the contrary, any modifications which appear evident to the expert in the art.

What is claimed is:

1. A packing case permitting storage by stacking a number of cases one onto the other, providing free access to the contents of each case in stacked condition, comprising a volume of insulating material including receiving openings and arranged within an outer, rigid, parallelepipedical structure, a side face thereof in substantially perpendicular orientation to said openings being removable from the outer, rigid structure, said removable side face containing a plate of insulating material which contains two grooves provided for receiving two removable intercalations provided to be disposed between two like packing cases during storage.

2. The packing case of claim 1, characterized in that the volume of insulating material comprises slots for providing elasticity thereof.

3. The packing case of claim 1, characterized in that the outer rigid structure comprises a second side face, opposed to said removable side face, a plate of insulating material being arranged between said volume of insulating material and said second side face.

4. The packing case of claim 1, characterized in that the insulating material is polystyrene.

5. The packing case of claim 1, characterized in that the removable side face is connected to two of its adjacent side faces of the outer, rigid structure by means of clips which are arranged on said side faces such as to block projections arranged on said removable side face.

6. The packing case of claim 1, characterized in that the removable side face is connected to the outer rigid structure by means of hooks.

7. Packing case according to claim 1, characterized in that said intercalations and said outer, rigid, parallelepipedical structure are made of wood.

8. Packing case according to claim 1, characterized in that the removable side face is connected to the outer, rigid structure by means of knuckle joints.

* * * * *